UNITED STATES PATENT OFFICE.

FRITZ POLLAK, OF VIENNA, AUSTRIA, ASSIGNOR, BY MESNE ASSIGNMENTS, TO THE CHEMICAL FOUNDATION, INC., A CORPORATION OF DELAWARE.

PROCESS FOR MAKING LIGHT-COLORED, AIR AND LIGHT PROOF CONDENSATION PRODUCTS FROM PHENOL AND FORMALDEHYDE.

1,369,352. Specification of Letters Patent. Patented Feb. 22, 1921.

No Drawing. Application filed June 12, 1914, Serial No. 844,819. Renewed July 2, 1919. Serial No. 308,268.

*To all whom it may concern:*

Be it known that I, Dr. FRITZ POLLAK, residing in Vienna, Austria (whose post-office address is 178 Linke Wienzeile, Vienna, Austria), have invented certain new and useful Improvements in Processes for Making Light-Colored, Air and Light Proof Condensation Products from Phenol and Formaldehyde; and I do hereby declare the following to be a full, clear, and exact description of the invention, such as will enable others skilled in the art to which it appertains to make and use the same.

It is well known that phenol or its homologues and formaldehyde or its polymers are capable of reacting, when heated by themselves or in presence of catalytic or condensing agents, to yield condensation products which are insoluble in almost all solvents and can be used as substitutes for glass, celluloid, ivory, bones, amber, corals and so on. Great difficulty has been experienced however in obtaining products of this kind which are light colored or almost colorless and which on being exposed to the influence of air and light will not deteriorate as far as their gloss and color are concerned. The best products hitherto made were obtained from a mixture of pure phenol and pure paraformaldehyde or polyoxymethylene without any catalytic or condensing agents being added.

I have now discovered a method for making light colored, air and light proof condensation products of the kind described from a mixture of phenol or its homologues and formaldehyde or its polymers in the presence of catalytic or condensing agents. By proceeding in the manner hereinafter described complete control as to the qualities of the products obtained is secured and other important advantages are attained as set forth.

In practising the process, the following points should be carefully observed, viz.

1. The percentage of catalytic or condensing agents of acid or basic reaction used in the initial or condensing phase of the process should be kept as low as possible;

2. The phenol still present in the reaction product should be removed by repeatedly shaking the mass with water at a temperature below 40 degr. C.;

3. The soap-like mass obtained by the treatment described above should be treated with neutral aqueous solutions of appropriate neutral substances which substances should afterward be removed.

The problem to be solved here, although seemingly of a simple nature, is in fact rather complicated. If chemically pure phenol and formaldehyde could be made to react with each other at a low temperature, the product of condensation obtained would be not only colorless, but it would also resist the influence of air and light and no change in color would occur. Unfortunately the said substances cannot be made to react without the aid of contact substances such as acids or bases, or by prolonged heating at high temperatures. In the latter case colored products will be formed under all circumstances by oxidation. If contact substances are added, such substances being *per se* impurities impairing the quality of the condensation products, they give rise to the formation of leuco substances which will under the influence of air and light be converted into colored combinations, thus effecting a detrimental change in the color of the resins (initial condensation products) or plastic masses (final condensation products) obtained.

In my copending applications Ser. Nos. 701,572 and 715,164, filed June 4, 1912, and August 15, 1912, respectively, I have described methods for making condensation products from phenols and certain polymers of formaldehyde (anhydrous trioxymethylene, being a mixture of $\delta$ and $\gamma$ oxy methylene), these substances reacting with each other without the addition of condensing agents and at a temperature not exceeding 100 degr. C. Under these favorable circumstances products of condensation are formed which are practically colorless, and which will also practically resist the action of air and light inasmuch as the quantity of leuco products formed in the reaction is exceedingly small. Nevertheless even such products will undergo certain changes of color after a space of time which, in the case of products such as artificial amber, should be avoided by all means.

In order to get rid of the leuco products which may have been formed during the reaction, I proceed as follows: First of all I take care to have as little as possible of such leuco products present in the reaction product, in order to keep the quantity of such leuco products to be removed at as small a value as possible. These leuco products being dissolved in the free phenol which is always present in the reaction mixture after condensation, the phenol containing them must be removed as completely as possible. This, however, is rendered very difficult by the fact that the product of condensation is a resinous mass which does not mix freely with water. Washing with hot water in order to keep the mass in liquid state is not possible as the elevated temperature influences the formation of colored matters as previously explained. Therefore washing must be proceeded with at as low a temperature as possible. In this manner the greater part of the free phenol containing the leuco products may be washed out, but the rest must be removed by special means. By adding to the washing water a substance capable of dissolving the phenol still admixed with the resin, the resinous mass is rendered permeable to water, thus allowing the phenol within the mass to be completely washed out. In this way the last traces of phenol containing the leuco substances mentioned above are taken up by the dilute solvent, the condensation products proper being prevented from being dissolved in the said solvents on account of the great dilution of the latter.

The problem of getting rid of the last traces of the leuco substances is equal to the problem of getting rid of the last traces of free phenol, and this problem can only be solved by extraction with water. The resinous mass, however, becoming more solid or dense at the end of the washing operation will become impervious to water before all of the phenol has been removed, and it is only by attacking the mass anew with dilute solutions of the solvents that it can be rendered permeable again to the water.

The solvents spoken of may be replaced by substances oxidizing phenol as the capacity of phenol for dissolving the said leuco products is greatly increased by oxidation.

Appropriate for use in the washing operation according to my invention are all those compounds which, notwithstanding the presence of a large proportion of water, form a homogeneous mixture in any proportion with phenols as well as with the soluble resins. I may employ to this end for instance alcohols, ketones, or aldehydes and hydro phenols. I may further employ compounds such as hydrogen peroxid or sugar. One or a plurality of such compounds in dilute aqueous solution is allowed to act upon the soluble intermediate products of condensation which have previously been freed, by repeated shaking with water, from the greater part of the phenol present. The compounds used are then removed as completely as possible by repeated shaking with water. The remaining mass can now be converted into the insoluble final product in any well known manner, fresh quantities of formaldehyde being added if necessary.

It may be found useful in some instances to employ two or more of the compounds mentioned above, one after the other.

The manner of treatment may be widely varied in accordance with the character of the raw products employed and the final products to be produced.

*Example I.*

100 parts by weight of crystallized carbolic acid and 80 parts by weight of formaldehyde of 40 per cent. are heated under a reflux condenser with 0.2 parts by weight of sodium phenolate until the condensation product is precipitated. The heavier resinous layer is separated from the supernatant aqueous solution and is shaken repeatedly with 100 parts by weight of water. The soap-like mass obtained is well washed with a solution of 10 parts by weight of methyl alcohol in 100 parts by weight of water and, afterward, with greater quantities of cold water, the residue is freed from the last traces of phenol by distillation *in vacuo*, is then filled in molds and, by heating at 95 to 120 degr. C., is converted into the infusible and insoluble product. The product obtained in this manner is colored a light yellow, it is transparent and air and light proof.

*Example II.*

By replacing the methyl alcohol employed in Example I by equal parts of a neutral 3 per cent. solution of hydrogen peroxid a somewhat darker product is obtained, which however is almost alsolutely light and air proof.

*Example III.*

94 parts by weight of crystallized carbolic acid are heated to 85 degr. C. in an oil bath of 90 degr. C. 15 parts by weight of finely powdered α-polyoxymethylene and a quantity of 1/5 normal sulfuric acid sufficient to start an exothermic reaction and to cause the polyoxymethylene to dissolve are then added. Another 5 parts of α-polyoxymethylene are then added together with 1/5 normal sulfuric acid, until the reaction comes to an end. The fluid mass is freed from impurities by filtering off the latter and after having been washed repeatedly with 100 ccm. of water is mixed and shaken with a 0.3 per cent. solution of hydrogen peroxid. After standing for some hours the mass is repeatedly washed with water in order to remove the oxidizing agents. The intermediate product thus obtained can then be mixed with some fresh formaldehyde or polyoxymethylene and be converted into an absolutely light and air proof insoluble product.

The resistance of the products made in accordance with the procedure given above is not affected by the addition of mildly acting catalytic agents at the end of the washing procedure, such an addition being required for instance in some cases where it is desired to shorten the final hardening process.

The word "phenol" as employed in the claims is intended to include the homologues of phenol or other phenolic bodies; and the word "formaldehyde" is intended to include the polymers of formaldehyde.

I claim:

1. In a process for making light and air proof insoluble condensation products from phenols and formaldehyde, the preparation of a soluble intermediate product and treating it with dilute aqueous neutral solutions of substances capable of forming homogeneous mixtures in all proportions with phenol and water.

2. In a process for making light and air proof insoluble condensation products from phenols and formaldehyde the preparation of a soluble intermediate product with the aid of minute quantities of a condensing agent, shaking said intermediate product with water, treating it with dilute aqueous neutral solutions of substances capable of forming homogeneous mixtures in all proportion with phenol and water, subsequently washing the product so treated with water in order to remove said substances and then converting said product into an insoluble final product.

3. In a process for making condensation products of the character described from phenol and formaldehyde, the preparation of a soluble product with the aid of small quantities of a condensing agent, washing said product with water, further washing said product at ordinary temperature with dilute neutral solutions of substances capable of forming homogeneous mixtures in all proportions with phenols and water, and then removing said solutions by washing with water at ordinary temperature.

4. In a process for making condensation products of the character described from phenol and formaldehyde, the preparation of a soluble product with the aid of small quantities of a condensing agent, washing said product with water, further washing said product at ordinary temperature with dilute neutral solutions of substances capable of forming homogeneous mixtures in all proportions with phenols and water, removing said solutions by washing with water at ordinary temperature, and then converting said product into an insoluble final product.

5. In a process for making light and air proof insoluble condensation products from phenols and formaldehyde, the preparation of a soluble intermediate product and treating it with dilute watery neutral solutions at ordinary temperature of substances capable of forming homogeneous mixtures in all proportions with phenols and water.

6. In a process for making light and air proof insoluble condensation products from phenols and formaldehyde, the preparation of a soluble intermediate product, treating it with dilute watery neutral solutions of substances capable of forming homogeneous mixtures in all proportions with phenols and water, washing it with water, and then converting it into an insoluble final product.

In testimony whereof, I affix my signature in presence of two witnesses.

Dr. FRITZ POLLAK.

Witnesses:
August Fugger,
Adelaide Funk.